July 5, 1949.  F. T. BARR  2,475,214
HYDROCARBON SYNTHESIS
Filed Oct. 12, 1944
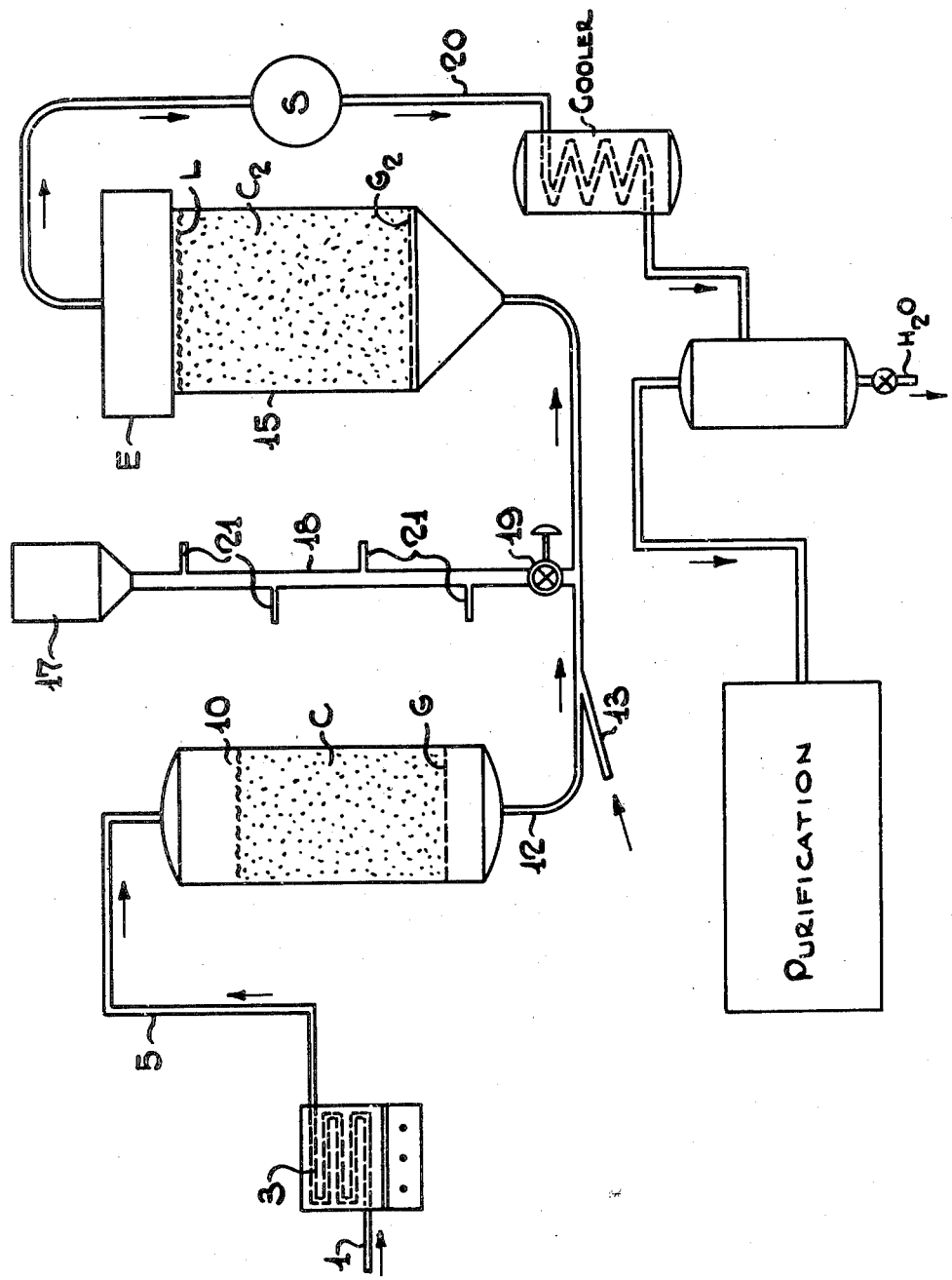
Frank T. Barr  Inventor
By P. V. Young  Attorney Patented July 5, 1949

2,475,214

UNITED STATES PATENT OFFICE 2,475,214

HYDROCARBON SYNTHESIS

Frank T. Barr, Summit, N. J., assignor to Standard Oil Development Company, a corporation of Delaware Application October 12, 1944, Serial No. 558,338

1 Claim. (Cl. 260—449.6)

The novel features of my invention are disclosed in the following specification and claims read in connection with the accompanying drawing.

My present invention has to do with the synthesis of hydrocarbons from carbon monoxide and hydrogen. Broadly speaking, this synthesis is a matter of record. There are, of course, two general methods for carrying out such a synthesis from the standpoint of equipment used and they are, first, the use of a stationary bed of catalyst and, second, the so-called fluid catalyst technique wherein the catalyst used in the process is suspended in the vapors during the reaction. My improvements relate to the latter type of operation, and in brief compass they involve maintaining a large ratio of catalyst to synthesis gases in the reaction zone. To support the catalyst to give the high loading required, I employ a diluent gas, preferably one which is easily condensable from the product, such as steam, all of which will subsequently and more fully appear hereinafter.

The main object of my present invention has to do with improvements in the synthesis of hydrocarbons from carbon monoxide and hydrogen resulting in the production of normally liquid hydrocarbons containing substantial quantities of branch-chain paraffins.

Another object of my invention is to effect the conversion of carbon monoxide and hydrogen employing a catalyst which is suspended in concentrated state in the reactants during the course of reaction.

A still further object of my invention is to effect the synthesis of normally liquid hydrocarbons containing substantial quantities of branch-chain paraffins in the crude product under conditions such that the catalyst which is in powdered form is suspended in the reactants during the course of reaction and maintaining a relatively large weight ratio of catalyst to reactants in the suspension by employing an easily condensible diluent gas which may be removed without difficulty from the product, to maintain a dense suspension in the reaction zone in relatively large quantity with respect to the reactants.

An indicated previously, in certain processes involving the synthesis of higher hydrocarbons from carbon monoxide and hydrogen using the co-called "fluid catalyst" technique, high ratios of catalyst to synthesis gas charged to the reaction zone must be used. Difficulty is sometimes encountered in maintaining the large quantity of catalyst material required suspended and/or fully fluidized in the reaction gases. It has been proposed to increase the volume of the gas by the addition of inert gases which, while possible as a means of improving the suspension of the catalyst, is not desirable because of the increased amount of gas which must be handled in the system for recovering the liquid hydrocarbon products from unused synthesis gas and inert material.

As indicated, I have found that these difficulties may be advantageously overcome and the equipment for carrying out the process considerably simplified by using a readily condensible gas, such as steam, which is used to supplement the synthesis gas as an aid in maintaining the catalyst in suspension in the reaction zone. In ordinary practice the synthesis gas is produced at high temperatures, then is cooled and the water vapor content condensed and removed before charging the synthesis gases to the reaction zone.

Broadly speaking, my improvements involve in the preparation of the synthesis gases the step of cooling the same after their formation (for example, by treating methane with steam), but in which the formed synthesis gas is cooled only to the temperature of the synthesis operation, say about 400 to 600° F. The cooling of the synthesis gases may be accomplished by direct introduction of a water spray into the hot synthesis gases thereby forming steam, which operation may be easily carried out by injection of the water into the transfer line connecting the synthesis gas generator and the synthesis reactor. If this means is employed the necessity of a separate piece of equipment to cool to atmospheric temperature is thereby eliminated and the amount of water necessary for cooling is reduced to a very low fraction of that formerly used.

In the accompanying drawing, I have shown a flow plan which will serve to illustrate a modification of my invention.

Referring in detail to the drawing, a mixture of methane, steam and carbon dioxide is introduced into the present system through line 1, thence heated in a fired coil 3 to a temperature of 1000° F., whereupon the materials are withdrawn through line 5 and charged into the synthesis gas forming reactor 10 containing a catalyst C which may be nickel on a support such as kaolin promoted by magnesia or the like. It is desired in this synthesis to form CO and hydrogen in substantially one to two volume ratio. To accomplish this result the proportion of methane, steam and $CO_2$ in line 1 should be about 1:1.6:0.7. The steam, methane and $CO_2$ are under a pressure of from atmospheric to 200 lbs. per square inch in the reaction zone and are resident therein for the period resulting from the treatment of from 50 to 400 volumes of methane (measured at standard conditions) per volume of catalyst per hour. The catalyst temperature is at about 1500° F.

The product is withdrawn through a foraminous support G for the catalyst and an exit line 12 at a temperature of about 1500° F. I propose to inject water via line 13 into line 12 to the extent that the gas is cooled to a temperature of between 400 and 600° F. whereupon the cooled gases are then discharged into a hydrocarbon synthesis reactor 15 containing a suitable catalyst ($C_2$), as follows: The catalyst which may be, for example, metallic cobalt together with a suitable support, such as kieselguhr, and promotor, such as thoria, in the form of a powder is withdrawn from supply hopper 17 through a standpipe 18 controlled by a flow valve 19 and discharged into line 12. The standpipe is provided with a plurality of taps 21 into which a slow current of gasiform material, such as steam, may be injected for the purpose of causing the catalyst to flow smoothly through the standpipe 18. The catalyst of course forms a suspension in the synthesis gases in line 12 and is then conveyed into the synthesis reactor 15.

The catalyst, as stated, is in the form of a powder having a particle size of from 50 to 400 mesh, but preferably having a size of about 200 mesh for 90 per cent or more of the same. The catalyst is maintained in "fluidized" state, i. e., in the form of a dense suspension by flowing the reactants upwardly through a grid $G_2$ at a rate of from ½ to 5 ft. per second, preferably at a rate of 1½ to 3 ft. per second. The density of the suspension in the reactor from G to a point L is from 10 to 30 lbs. per cubic foot, and the mass of catalyst is in a highly turbulent, mobile state affording uniformity of temperature and thorough mixing throughout the entire mass. The amount of catalyst with respect to say CO, should be about 1 lb. of catalyst to 1 to 15 cubic feet of CO measured at 60° F. and 1 atmosphere pressure. Above L it will be noted that the reactor is expanded, which results in decreasing of the velocity of the gases passing into the expanded portion E is sufficiently low so that the gas will not support the catalyst with the result that substantially all of the catalyst remains in the reactor at a point not higher than L, the stream issuing from the reactor through 20 containing very little catalyst. This catalyst can be removed by any known procedure such as passage through one or more separators S, such as centrifugal separators, electrical precipitators, so that the stream is substantially free of catalyst.

It will be unnecessary for me to describe the usual method for condensing out the desired normally liquid hydrocarbons and returning unreacted CO and hydrogen to reactor 15 for further processing, since these details have been disclosed and are known to others. My disclosure, therefore, will contain so much of the prior art as will make my own improvements understandable, for it is my belief that this will serve to clarify and emphasize my own invention.

In order to give more information regarding my invention, I set forth the following specific working example.

25,000,000 cubic feet per day of natural gas are charged to line 1 together with 2,000,000 lbs. of steam and 17,000,000 cubic feet of carbon dioxide. This charge mixture is treated in vessel 10 at 1500° F. and approximately 50 pounds gage pressure to form about 100,000,000 cubic feet per day of a synthesis gas composed mainly of hydrogen and carbon monoxide in a 2:1 $H_2$ to CO volume ratio. An amount of water sufficient to reduce the temperature of this stream to 400° is injected by means of line 13. To accomplish this about 2,000,000–2,500,000 lbs. of $H_2O$ per day will be required, the exact amount depending on heat losses from the equipment, and the total steam in the stream thus cooled will amount to about 3,500,000 lbs. per day. It is desired to treat the hydrogen-carbon monoxide mixture and cause synthesis of hydrocarbon oils in reactor 15 at 400° F. and 50 lbs./sq. in., providing a catalyst bed of such volume that 100 volumes of the dry synthesis gas measured under standard conditions be conducted through the reactor each hour for each volume of catalyst; furthermore, it is desired to avoid actual superficial (i. e. assuming no catalyst in reactor) gas velocities based on inlet quantity lower than .75 feet per second (while this is not the lowest linear velocity at which satisfactory "fluidizing" of the catalyst bed will take place, some reduction in volume of the reactants takes place during conversion, so that higher than minimum linear velocity on inlet materials must be allowed for). If this synthesis were to be carried out after removal of practically all of the steam from the synthesis gas, a vessel of about 27 feet diameter and 72 feet height would be required to meet the above conditions. The height of this vessel is excessive giving rise to numerous difficulties in design, construction and operation, and reduction in height is desirable. If the synthesis gas containing steam as described above is run directly to reactor 20, the required conditions can be met using a reactor only 40 feet high and having a diameter of 36 feet. The product from reactor 20 consists of about 3,000 barrels per day of normally liquid and solid hydrocarbons, together with some unreacted carbon monoxide and hydrogen, and steam. The outlet stream is run to a cooler in which practically all of the steam is condensed by means of cooling water, and a large portion of the synthetic hydrocarbons. The tail gas may then be scrubbed to recover additional liquid hydrocarbons, and may then be recycled in part to vessel 10 wherein it will replace an equivalent amount of fresh charge gas. The remaining tail gas may be burned to supply fuel requirements in the plant.

I wish to point out that the use of excess steam in synthesis gas preparation is in no way undesirable, the slight increase in carbon dioxide concentration in the synthesis gas resulting therefrom being easily counteracted by an increase in temperature of the reaction. By this means hot synthesis gas mixed with a volume of steam equal to from 25–100 per cent the volume of $H_2$ plus CO produced is made available. The hot synthesis gas is cooled to synthesis reaction temperature by introduction of a water spray in the transfer line 13, thereby increasing the amount of steam.

As previously indicated, my invention consists in the means for maintaining a larger quantity of catalyst in contact with the reactants in the reaction zone than would otherwise be possible, the catalyst being in powdered form.

It is necessary to use additional quantities of gas to maintain the fluid-like suspension required, and this additional gas is supplied as added steam. The steam, however, since it is readily condensable does not involve a serious problem in the purification and recovery of the desired product.

What I claim is:

The method of synthesizing normally liquid hydrocarbons by reacting together carbon monoxide and hydrogen in a reaction zone in the presence of a powdered catalyst which comprises forming, at temperatures in excess of 1000° F., a gaseous mixture containing carbon monoxide, hydrogen and steam by reacting a methane containing gas with a gasiform material containing steam in a generation zone, withdrawing said gaseous mixture from said generation zone, adding water thereto in sufficient amount to cool the said gaseous mixture to temperatures of from about 400° to 600° F. and form steam, the total concentration of steam finally present in the gaseous mixture amounting to from 25% to 100% by volume of the amount of carbon monoxide plus hydrogen present in said gaseous mixture, feeding said last-named gaseous mixture to a reaction zone containing a body of powdered cobalt catalyst having a particle size of from about 200–400 mesh, causing said gaseous mixture to flow through said reaction zone at a superficial velocity of from about 1½ ft. to 3 ft. per second so that a dense, turbulent suspension of catalyst in gasiform material, having a density of from about 10–30 lbs. per cu. ft. is formed, permitting said gasiform material containing carbon monoxide and hydrogen to remain in contact with said catalyst for a period of time sufficient to effect the desired conversion and recovering from said reaction zone a product containing normally liquid hydrocarbons.

FRANK T. BARR.

REFERENCES CITED

The following references are of record in the file of this patent:

UNITED STATES PATENTS

| Number | Name | Date |
|---|---|---|
| 1,984,380 | Odell | Dec. 18, 1934 |
| 2,231,990 | Dreyfus | Feb. 18, 1941 |
| 2,243,869 | Kieth | June 3, 1941 |
| 2,244,196 | Herbert | June 3, 1941 |
| 2,309,034 | Barr | Jan. 19, 1943 |
| 2,347,682 | Gunness | May 2, 1944 |
| 2,360,787 | Murphree | Oct. 17, 1944 |

FOREIGN PATENTS

| Number | Country | Date |
|---|---|---|
| 474,191 | Great Britain | Oct. 27, 1937 |